(12) United States Patent
Pekander

(10) Patent No.: US 12,486,142 B2
(45) Date of Patent: Dec. 2, 2025

(54) MONITORING OBJECTS IN AN ELEVATOR SHAFT USING AN UAV

(71) Applicant: KONE Corporation, Helsinki (FI)

(72) Inventor: Otto Pekander, Helsinki (FI)

(73) Assignee: KONE CORPORATION, Helsinki (FI)

( * ) Notice: Subject to any disclaimer, the term of this patent is extended or adjusted under 35 U.S.C. 154(b) by 63 days.

(21) Appl. No.: 18/222,221

(22) Filed: Jul. 14, 2023

(65) Prior Publication Data

US 2023/0365281 A1 Nov. 16, 2023

Related U.S. Application Data

(63) Continuation of application No. PCT/FI2021/050204, filed on Mar. 23, 2021.

(51) Int. Cl.
*B66B 5/00* (2006.01)
*B64U 101/30* (2023.01)
*G05D 1/686* (2024.01)

(52) U.S. Cl.
CPC .......... *B66B 5/0025* (2013.01); *G05D 1/686* (2024.01); *B64U 2101/30* (2023.01); *B64U 2201/20* (2023.01)

(58) Field of Classification Search
CPC .. B66B 5/0025; G05D 1/686; B64U 2201/20; B64U 2101/30
See application file for complete search history.

(56) References Cited

U.S. PATENT DOCUMENTS

2016/0068264 A1 3/2016 Ganesh et al.

FOREIGN PATENT DOCUMENTS

| EP | 3 627 105 A2 | 3/2020 |
|---|---|---|
| JP | 2017-128440 A | 7/2017 |
| JP | 2018-203486 A | 12/2018 |
| JP | 2020-179955 A | 11/2020 |
| WO | 2018/066051 A1 | 4/2018 |

OTHER PUBLICATIONS

International Search Report for PCT/FI2021/050204 mailed on Nov. 11, 2021.
Written Opinion of the International Searching Authority for PCT/FI2021/050204 mailed on Nov. 11, 2021.

*Primary Examiner* — Michael D Lang
(74) *Attorney, Agent, or Firm* — Birch, Stewart, Kolasch & Birch, LLP

(57) ABSTRACT

A method and a system monitor a movable object in an elevator shaft by an unmanned aerial vehicle (UAV). The UAV is positioned into a wanted location within the elevator shaft, in which the movable object to be monitored is within view of an imaging sensor of the UAV, and movement of the UAV is automatically synchronized with the movement of the movable object based on UAV's on position and movement characteristics and received status data. Imaging sensor of the UAV obtains image data of the movable object during operation of the elevator and image data is stored and/or sent wirelessly.

18 Claims, 4 Drawing Sheets

MONITORING OBJECTS IN AN ELEVATOR SHAFT USING AN UAV

CROSS REFERENCE TO RELATED APPLICATION

This application is a Continuation of PCT International Application No. PCT/FI2021/050204, filed on Mar. 23, 2021, which is hereby expressly incorporated by reference into the present application.

FIELD

The present invention relates to a method, a system and a computer program product related to following objects by an unmanned aerial vehicle (UAV) within a closed space. More particularly, the invention relates to using an UAV for monitoring moveable objects in an elevator shaft.

BACKGROUND

For predictive maintenance of an elevator, large amount of data is needed for condition monitoring of the elevator. Before final failure occurs, problems in mechanics or electronics are often indicating themselves through increased temperature or noise. Thus, continuous measurements of temperature or noise are beneficial for predictive maintenance. However, even if increased temperature or noise is detected, it is not always clear what is the root cause of the noise.

For troubleshooting purpose, it may be necessary to monitor one or more parts of the elevator during operation of the elevator. However, a monitored part may be in a place, for example in the bottom or at the top of the elevator car, where a single person cannot see it while he is at the same time moving the elevator.

In a typical elevator system, there is a machine room remote from the elevator, that comprises one or more controllers for controlling operation of the elevator. The one or more controllers enable adjusting parameters of the elevator as well as provide error codes in case of operation errors. Thus, for performing maintenance work, it is often necessary to access the machine room for inputting information to and/or receiving information from the elevator's control system.

DESCRIPTION OF THE RELATED ART

"Drone" is a commonly used term for various unmanned aerial vehicles (UAV). So called "follow me" capable drones (UAVs) that can follow an object on move are commercially available. Such following functionality has been implemented i.e. using a GPS device held by an object to be followed, by vision recognition technology or with a combination thereof.

Patent applications US2020072624 and US2020072613 disclose methods of flying a drone in interior passageway, such as an elevator shaft. The shaft can include sensors that report position of the elevators, and data can also include elevator's speed, direction of travel and any other attribute for determining or predicting expected location of the elevator during a drone route. This functionality is merely for avoiding collisions between the drone and the elevator, thus enabling use of the shaft by the drone as an interior passageway towards a destination.

Patent application JP2019142245 discloses a drone for performing inspection inside an elevator hoistway. The drone is attached with a sliding contact(s) to wire ropes for guidance for suppressing collisions i.e. due to wind.

A digital twin, as known in the art, refers to a virtual replica of a physical object. A digital twin is formed based on generated and/or collected digital data representing the physical object. A digital twin is provided by at least processing device and at least one memory associated therewith.

SUMMARY

An object is to provide a method and apparatus so as to solve the problem of inspecting objects within the elevator shaft during operation of the elevator. The objects of the present invention are achieved with a method according to the claim 1. The objects of the present invention are further achieved with an apparatus according to the claim 6.

The preferred embodiments of the invention are disclosed in the dependent claims.

According to a first aspect, a method for monitoring a movable object in an elevator shaft by an unmanned aerial vehicle (UAV) is provided. The method comprises positioning the UAV into a wanted location within the elevator shaft, in which the movable object to be monitored is within view of an imaging sensor of the UAV, determining the UAV's position and movement characteristics based on information obtained by at least one sensor carried by the UAV, wirelessly receiving status data concerning an elevator car moveable within the elevator shaft, automatically synchronizing movement of the UAV with the movement of the movable object based on the determined UAV's own position and movement characteristics and the received status data, and simultaneously obtaining, by the imaging sensor of the UAV, image data of the movable object during operation of the elevator, and storing and/or wirelessly sending the obtained image data showing the movable object.

According to a second aspect, said positioning the UAV into the wanted location comprises a) receiving an indication of the movable object as a reference to the respective object in a digital twin of the elevator, and automatically moving the UAV to the wanted location using the digital twin of the elevator and said UAV's position and movement characteristics, or b) guiding the UAV to the wanted location using manual remote control, and receiving an indication of the movable object to be monitored from the user by a reference to the image of the movable object shown in the image provided by means of the imaging sensor of the UAV.

According to a third aspect, the status data comprises at least one of elevator's landing call information, destination information and sensor information related to movement and/or position of the elevator car within the elevator shaft.

According to a fourth aspect, the status data comprises first status data and/or second status data. The method comprises receiving the first status data using wireless communication, the first status data comprising the elevator's landing call information and/or destination information from an elevator controller; and/or receiving the second status data using wireless communication. The second status data is generated on basis of sensor information obtained by one or more sensors of a sensor unit attached to the elevator car, wherein the second status data comprises at least one of location, acceleration and speed of the elevator car and/or the sensor unit.

According to a fifth aspect, said synchronizing movement of the UAV with the movement of the movable object is performed using a/the digital twin of the elevator, based on the determined UAV's own position and movement characteristics and the received status data.

According to a first system aspect, a system for monitoring a movable object in an elevator shaft is provided. The system comprises an unmanned aerial vehicle (UAV) comprising an imaging sensor and at least one sensor configured to provide information on position and movement characteristics of the UAV and a display unit configured to display an image obtained by the imaging sensor of the UAV. The UAV is configured to be positioned into a wanted location within the elevator shaft in which the movable object to be monitored is within view of the imaging sensor of the UAV, to determine its position and movement characteristics based on information obtained by the at least one sensor comprised in the UAV, to receive status data concerning an elevator car moveable within the elevator shaft, to automatically synchronize its movement with the movement of the movable object based on the determined UAV's own position and movement characteristics and the received status data, and to simultaneously obtain, by the imaging sensor, image data of the movable object during operation of the elevator, and to store and/or to wirelessly send the obtained image data showing the movable object for displaying the obtained image data on the display apparatus.

According to a second system aspect, the UAV comprises a) a digital twin of the elevator, and communication means for receiving an indication of the movable object as a reference to the respective object in the digital twin of the elevator, wherein the UAV is configured to automatically move to a wanted location using at least the digital twin of the elevator and the UAV's position and movement characteristics, or b) communication means configured to receive instructions provided by using a manual remote control unit for guiding the UAV into the wanted location, and to receive an indication of the movable object to be monitored from the user by a reference to an image of the movable object shown in an image obtained by the imaging sensor of the UAV and displayed by the display apparatus.

According to a third system aspect, the status data comprises at least one of elevator's landing call information, destination information and sensor information related to movement and/or position of the elevator car within the elevator shaft.

According to a fourth system aspect, the status data comprises first status data and/or second status data. The UAV comprises at least one wireless communication unit configured to receive the first status data concerning the elevator's landing call information and/or destination information from an elevator controller, and/or to receive the second status data, wherein the second status data generated on basis of sensor information obtained by one or more sensors of a sensor unit attached to the elevator car comprises at least one of location, acceleration and speed of the elevator car and/or the sensor unit.

According to a fifth system aspect, the UAV comprises a/the digital twin of the elevator, and the UAV is configured to synchronize its movement with the movement of the movable object using the digital twin of the elevator, based on the determined UAV's own position and movement characteristics and the received status data of the elevator car.

The present invention is based on the idea of using information regarding both the position and movement of the UAV and the position and movement of the elevator car with a digital twin of the elevator for synchronizing the movement of the UAV with movement of the supervised object associated with the elevator car.

The present invention has the advantage that it enables taking at least one picture or a video representing a moving object, i.e. a part of the elevator to be monitored, while the elevator is operating.

Since the UAV can keep its position with respect to the supervised object for a long period of time, a technician can operate the UAV even from a machine room and directly monitor the supervised object within the shaft. Thus, the technician does not need to move back and forth from a machine room or like to elevator shaft, or to have another technician in the shaft for supervising various objects, while one technician is in the machine room for monitoring things like error codes or status information from a controller in the machine room. Sometimes this can be very advantageous when for example parameters of the controller are being adjusted and the elevator is used for testing effects of the adjusted parameters. Furthermore, while the UAV is enabled to synchronize itself autonomously to the movement of the supervised object, the operator only needs to indicate the object for the UAV, and thereafter, no human control of the UAV is required during the synchronized operation of the UAV, which is referred to as a synchronization mode. In this way the UAV can give real time feedback for the technician, thus improving efficiency of the maintenance work and shortening maintenance breaks when elevator is not available for use by common users. Faster inspection of the elevator as well as reduced amount of maintenance personnel needed leads to shorter down times of the elevator due to maintenance as well as reduced maintenance cost.

BRIEF DESCRIPTION OF THE DRAWINGS

In the following the invention will be described in greater detail, in connection with preferred embodiments, with reference to the attached drawings, in which.

DETAILED DESCRIPTION

Figure 1:
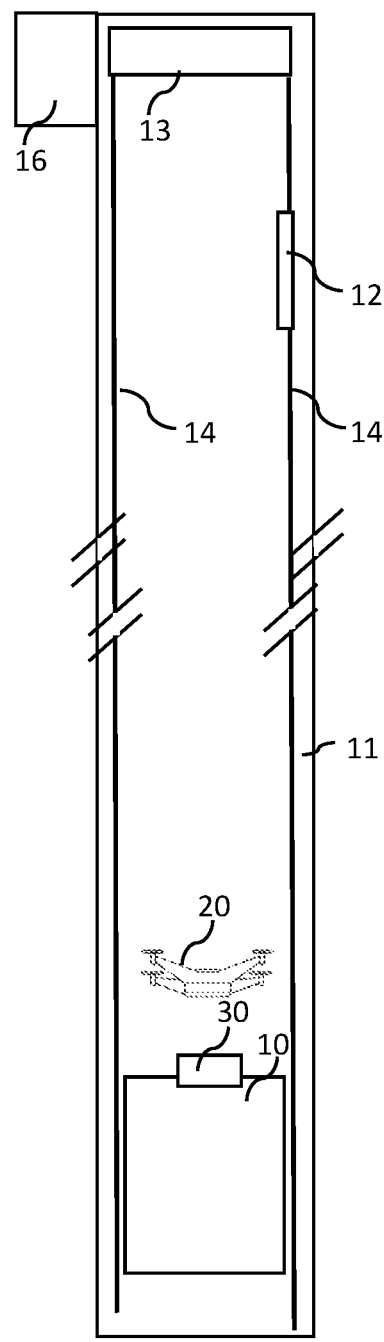
FIG. 1 is a schematic illustration of main elements of an elevator.

The FIG. 1 shows a schematic view of an elevator equipped with the system according to the invention. An elevator car (10), which may be referred in short as the car (10), operates in a shaft (11). The car (10) is moved by a hoisting machine and carried by ropes (14) attached to the car (10). One or more counterweights (12) are typically attached to the ropes (14) and guided by counterweight guides (not shown), the one or more counterweights (12) moving in opposite direction to that of the car (10). In a traditional elevator, there is a machine room above the shaft, whereas many modern elevators have a hoisting machine (13) inside the shaft (11). The elevator shaft (11) and/or the car (10) further comprises large amount of various operation and safety gear. According to the invention, an UAV (20) operates within the shaft (11), where it operates at least partly autonomously: the UAV may be assigned with tasks, which are then performed by the UAV without requirement for constantly controlling it's movement by an operator. A docking station (30) may be provided for the UAV (20), preferably attached to the outside of the car (10). Preferably a docking station (30) is disposed on the roof of the car (10) so that the UAV (20) may land on the docking station (30)

from above. However, for performing the supervision operation according to the current invention, no docking station (30) is required, since an UAV (20) may also be temporarily inserted in the shaft (11) either above or below the elevator car (10) for the duration of the respective inspection only. An elevator controller (16) controls operation of the elevator. The elevator controller (16) is typically located near the shaft (11), and it may serve a single elevator or a group of elevators, in which case it is typically called an elevator group controller.

Figure 2:
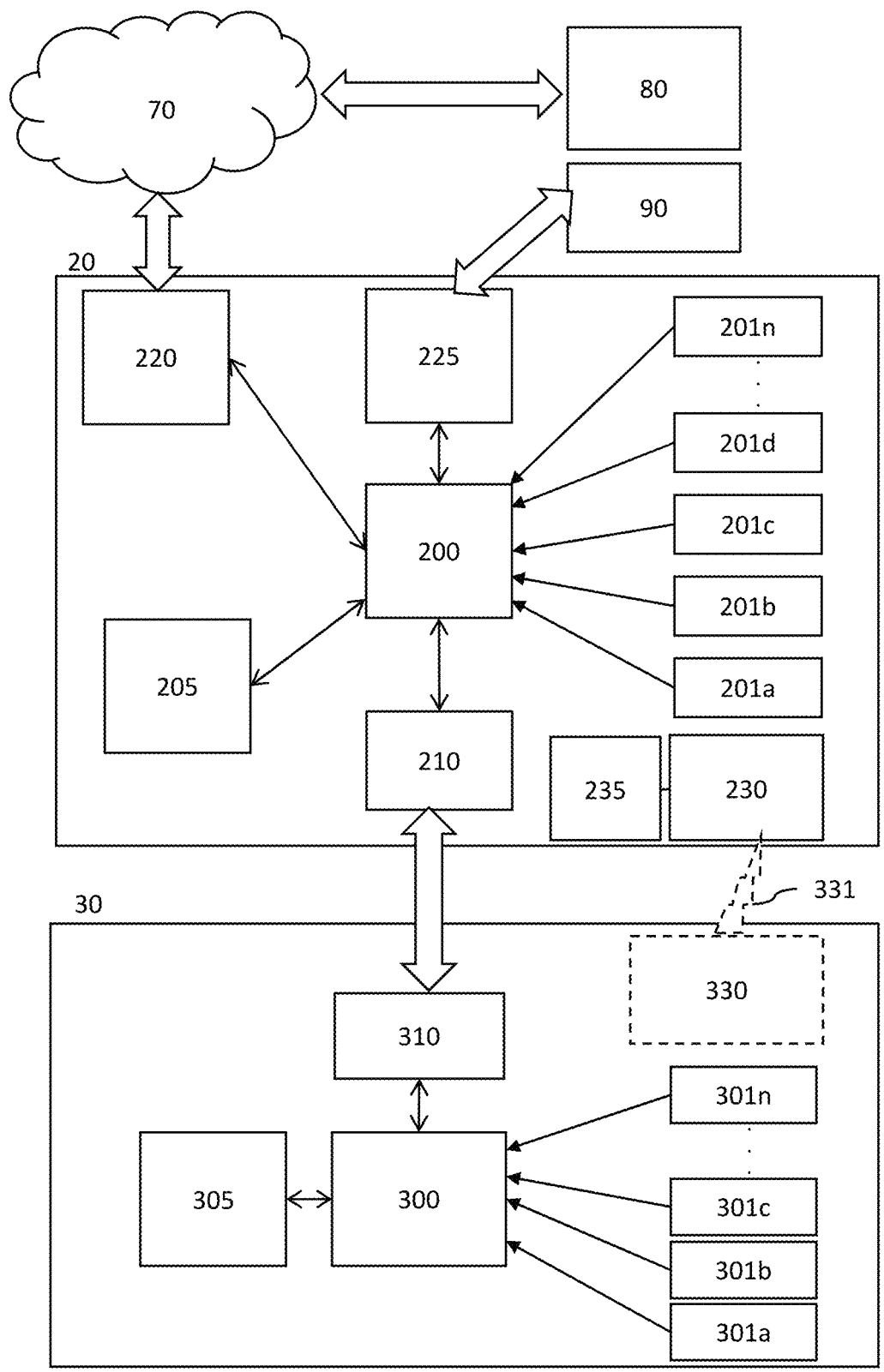
FIG. 2 illustrates schematically elements of the UAV and a sensor unit that facilitate operations according to the invention.

FIG. 2 illustrates schematically some elements of the UAV and a sensor unit that facilitate operations according to the invention.

The UAV (20) comprises at least one processing device (200) that is operable for performing autonomous navigation of the UAV as well as collecting sensor information and communication. The at least one processing device (200) comprises avionics, i.e. electronic systems that control communications, navigation, display and management of various systems of the UAV. The UAV (20) is provided with a plurality of sensors (201a to 201n) operatively coupled to the at least one processing device (200). The plurality of sensors comprises at least one imaging sensor (201a) like a camera, and preferably at least one of: a remote thermometer, an accelerometer, a gyroscope, a magnetometer, a lidar, a radar, a pressure sensor and a humidity sensor, and/or any other applicable sensor.

The at least one processing device (200) is operatively coupled to at least one memory (205) for storing computer program code that comprises computer executable instructions for the at least one processing device (200) as well as storage for at least temporarily storing information received from the sensors (201a, 201b, 201c, 201d, . . . 201n) and/or via communication units (210, 220) of the UAV (20). The at least one processing device (200) is further operatively coupled to a first communication unit (210) for providing communication between the UAV (20) and a sensor unit (30) attached to the elevator car. The sensor unit (30) is provided or operatively connected to wireless communication unit for enabling communication between the UAV and the sensor unit (30). The sensor unit (30) is preferably disposed at the roof of the elevator car. The sensor unit (30) may also operate as a docking station for the UAV, enabling for example charging batteries of the UAV. The first communication unit (210) may be for example a so-called short-range wireless communication unit operating according to any suitable short-range communication technology standard, including but not limited to Wireless local area network (WLAN), Bluetooth®, Bluetooth low energy (BLE), and mesh technologies like Thread and Bluetooth Mesh. Short range wireless communication enables the docking station to interface and communicate not only with the UAV (20) but also with other components, such as internal sensors of the elevator within the shaft.

The UAV (20) may comprise a second communication unit (220) for providing second wireless communication over an external communication network (70), which may be for example a cellular network, such as a 3G, 4G or 5G cellular network or any other suitable long-range communication network. The external communication network (70) is operable for providing preferably two-way communication between the UAV (20) and one or more control and/or supervision entities (80), for example towards the elevator controller, elevator group controller, computing equipment of a maintenance center, maintenance equipment, monitoring equipment, an operations control center and/or like. Alternatively, the second communication unit (220) may be a short-range wireless communication device, for example a WLAN device, that provides communication towards the external communication network via a gateway device (not shown).

Either the first communication unit (210) or the second communication unit (220) or a third communication unit (225) operatively connected to the at least one processing device (200) is operable for providing communication between the UAV (20) and a remote control unit (90) operable by a technician, for enabling manual remote control of the UAV. The FIG. 2 illustrates an option in which there is a dedicated third communication unit (225) that provides wireless connection for remote control by the remote-control unit (90). This wireless connection may be dedicated for remote control only, or it may be a two-way wireless connection that enables for example wirelessly transferring image data obtained by the imaging sensor of the UAV (20) towards a remote control unit (90) provided with or connected to a display.

The UAV (20) also comprises a charging unit (230) for charging at least one battery (235) of the UAV that is used for providing power for the above-mentioned functional elements of the UAV (20) as well as for operating its propellers (not shown) or other suitable means for providing thrust that enable maneuvering the UAV mid-air under control of the avionics.

A sensor unit (30) comprises communication unit (310) for communicating information with the first communication unit (210) of the UAV (20). Communication unit (310) is operatively coupled to at least one processing device (300). The sensor unit (30) is provided with a plurality of sensors (301a, 301b, 301c, . . . 301n) operatively coupled to the at least one processing device (300). The plurality of sensors comprises at least one of a thermometer, an accelerometer, a gyroscope, a magnetometer and a pressure sensor. One of the main purposes of the sensors comprised in the sensor unit (30) is to provide real-time information on movement and/or position of the elevator car. When the sensor unit (30) is attached to the elevator car, information on position and/or movement of the sensor unit (30) can be used for determining the position and/or movement of the elevator car. The at least one processing device (300) is operatively coupled to at least one memory (305) for storing computer program code that comprises computer executable instructions for the at least one processing device (300) as well as storage for at least temporarily storing information received from the plurality of sensors (301a to 301n). The communication unit (310) provides wireless communication between the respective second communication unit (210) of the UAV (20) and the sensor unit (30). The second communication unit (210) that provides communication towards the first communication unit (210) of the UAV (20) is a short-range wireless communication device operating according to the same communication standard with the first communication unit (210).

As known in the art, a typical UAV (20) operates with electrical energy. The sensor unit (30) may be implemented as a docking station, in which case the sensor unit would typically comprise a charging station (330) for charging and re-charging (331) the at least one battery (235) of the UAV (20). However, for performing the current invention, charging station (330) is not required and thus optional, thus marked with dashed outline.

Figure 3:
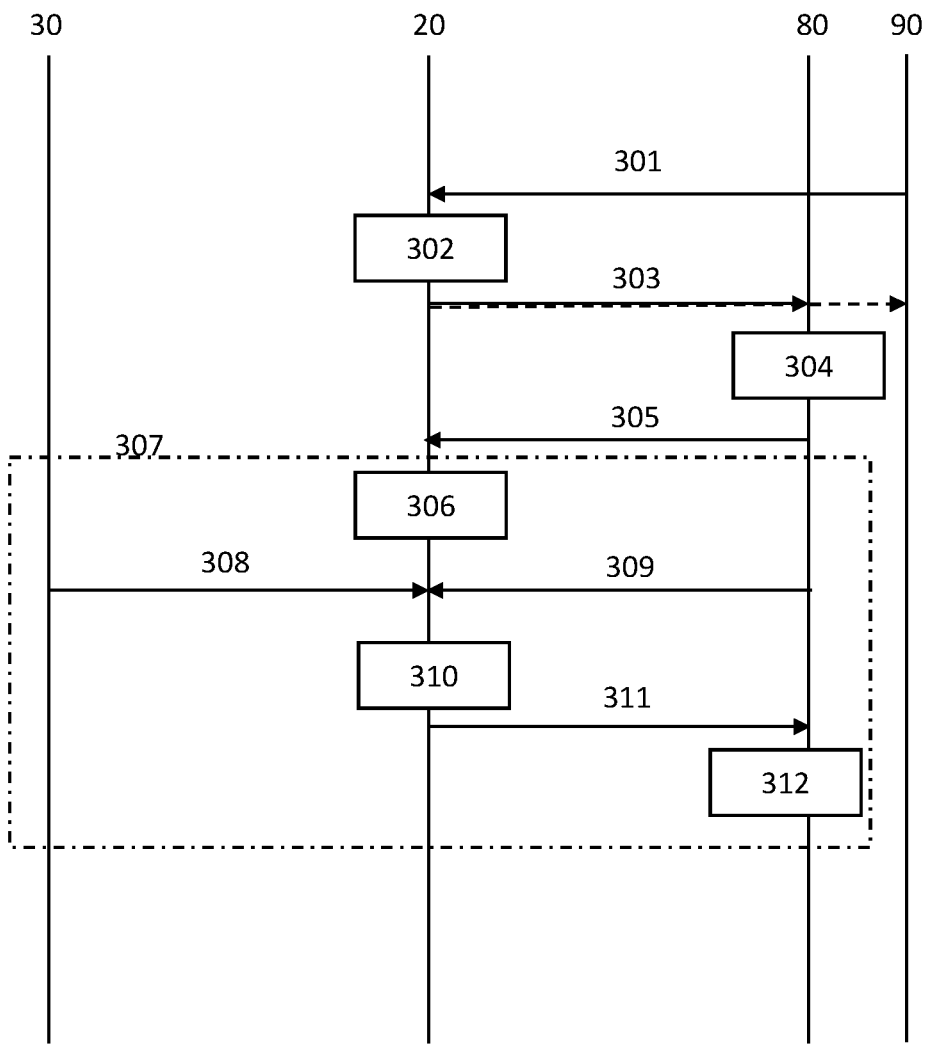
FIG. 3 illustrates steps of a first method.

FIG. 3 illustrates schematically a first embodiment of a method and system according to the current invention.

In the first embodiment, a technician uses a remote control (90) to guide the UAV (20) next to an object (s)he wants to monitor by controlling the UAV manually (301). The remote control (90) may be a traditional UAV remote control device with or without a display or it may be operatively associated with the control and supervision entity (80). During this step, the imaging sensor of the UAV preferably continuously obtains image data (302), that is communicated wirelessly (303) and displayed (304) by a display apparatus, which may be associated with the control and supervision entity (80) and/or the remote control (90) so that the technician can visually determine where the UAV (20) is moving to facilitate the guiding process.

The at least one imaging sensor of the UAV preferably obtains real-time video image during the manual remote controlling step.

Upon arrival by the UAV in the wanted position, in which the object to be supervised is shown in the image obtained by the imaging sensor of the UAV (20), the technician can point the object to be monitored in the obtained image that is shown (304) on the display. The object to be monitored is determined using computer vision and said pointing, and this information sent to the UAV (305), whereby the UAV enters (306) a synchronization mode (307), in which the UAV starts automatically following the selected object within the elevator shaft independent of the followed object's mobility state. Any known computer-based method of pointing an object in the image may be used, such as pointing the object by a mouse, by a finger or stylus in a touch-capable user interface, or pointing the object by the user using a virtual reality (VR) user interface, which may be implemented for example using a VR headset or like. A computer vision application is preferably used for identifying and locking to the pointed object to be monitored, and information regarding the pointed object that is to be monitored is communicated back to the UAV.

During the synchronization mode (307) the UAV continuously receives (308, 309), using its wireless communication capabilities, status data from the sensor unit (30) and/or from the control and supervision entity (80). During the synchronization mode, the UAV also continuously uses (310) its own sensors to determine its own position within the shaft. Received status data and information of the UAV's own position is utilized by the UAV's one or more processing devices (200) to control the avionics for autonomously synchronizing the UAV's own movement with movement of the monitored object.

During the synchronization mode (307), the UAV stores and/or wirelessly sends (311) image data obtained with its imaging sensor. Preferably, the image data comprises streaming, real-time video image. Processing delays of the image data does not render the image data as not being real-time. During the synchronization mode (307), the monitored object is displayed (312) continuously in a display associated with the control and supervision unit (80) and/or the remote control (90), and the technician can then visually inspect operation of the monitored object based on the displayed image, whereby (s)he is able to determine whether the monitored object operates correctly or not. In an enhanced embodiment, machine vision and learning can be used for analyzing the image obtained during the synchronization mode and determining whether the monitored object operates correctly or not. As an alternative of or in addition to real-time video image streaming, the UAV may store the obtained image data so that it can be later transferred for monitoring at the control and supervision unit (80) and/or machine vision-based analysis of the previously obtained and stored image data. Storing the image data may be the preferred alternative for example if communication capabilities provided within the shaft are not good enough for continuous streaming of real-time video.

The synchronization mode (307) enables the UAV to follow any object that moves together with the elevator car.

Figure 4:
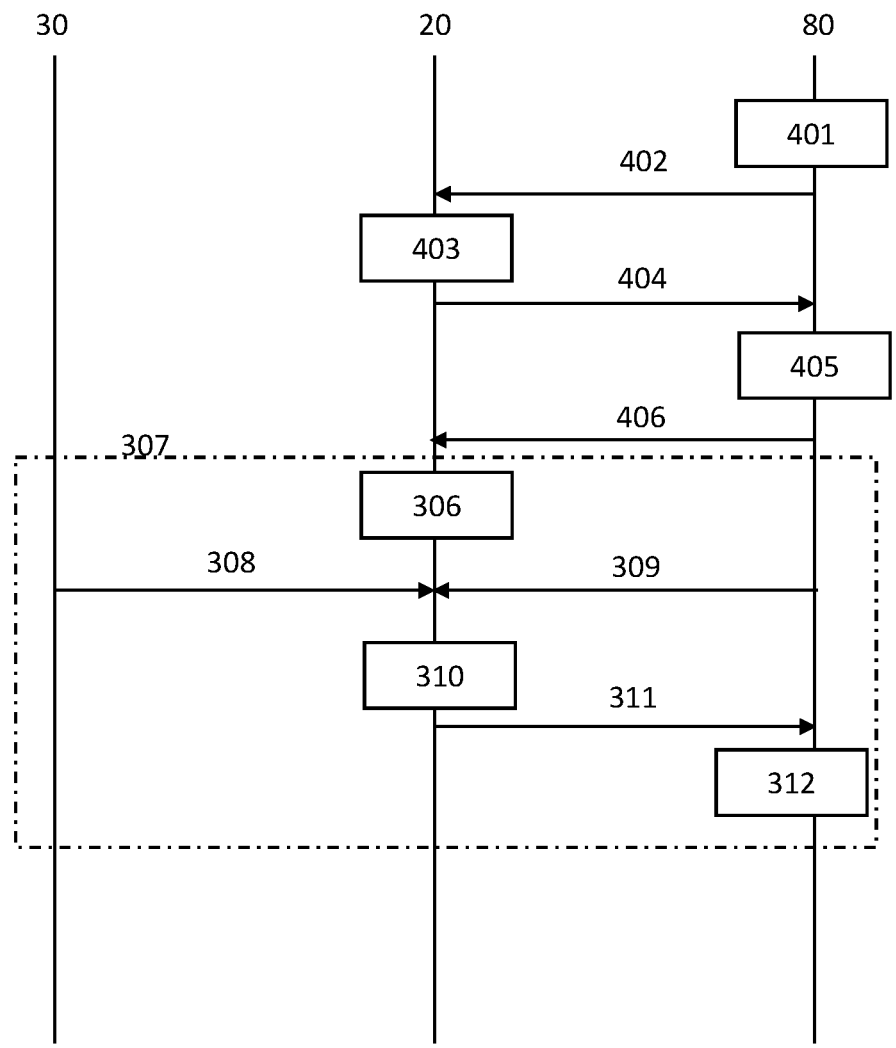
FIG. 4 illustrates steps of a second method.

FIG. 4 illustrates an alternative embodiment, which utilizes digital twins for finding the object to be monitored. The technician indicates (401), using the control and supervision entity (80) the object to be monitored for the UAV with help of a digital twin of the elevator. Information is sent (402) to the UAV, receiving this information over the applicable communication moves autonomously (403), in other words without further human navigation control, into a position in which the indicated object to be monitored is within the view of the UAV's imaging sensor, using the digital twin and knowledge of the UAV's own position.

The same digital twin or two essentially similar digital twins should be available for use both for the control and supervision entity (80) and for the UAV (20). The digital twin comprised in the UAV is stored in a memory (205) of the UAV and is used by the at least one processing device (200) of the UAV. Likewise, the digital twin comprised in a control and supervision entity (80) is stored in a memory of the control system and is executed by at least one processing device of the control and supervision entity (80).

The digital twin of the elevator comprises at least information concerning physical dimensions and/or structure of the shaft and the elevator car. The digital twin may further comprise information of various mechanical elements of the elevator, including but not limited to hoisting equipment, travelling ropes, guiderails, counterweight(s) and safety gear. Preferably, the digital twin also comprises information concerning position and movement characteristics of the elevator car, such as landing positions, speed and/or acceleration characteristics of the elevator car during operation. The digital twin preferably comprises information that enables the UAV to calculate position and movement characteristics of the counterweight, which correlates with the position and movement characteristics of the elevator car and thus can be calculated based on the position and movement information of the car and/or the sensor unit using a simple mathematical model.

While the UAV (20) autonomously moves (403) to the desired location, it may optionally obtain and send (404) image data wirelessly to the control and supervision entity (80), which can display (405) the obtained image data for the technician for verifying that the UAV moves to the correct position within the shaft. Optionally, the technician may use the remote control (not shown) of the control and supervision entity (80) to finetune the position of the UAV with respect to the object to be monitored for example for fine tuning the desired view of the obtained image. Optionally, an acknowledgement is sent (406) to the UAV (20) when it is determined that its position is correct and the wanted object is properly shown in the obtained image.

When the UAV (20) is in the desired location, it enters the synchronization mode (307).

For performing monitoring of the object that moves in synchronization with the elevator car, the UAV is set into the synchronization mode (307), in which it autonomously synchronizes its movement with movement of the monitored object and thus also with movement of the elevator car, using sensor and status data. Autonomous in this context means that the UAV controls its own position with respect to the followed object without intervention or control received from a human operator.

For enabling autonomous movement of the UAV within the shaft, the UAV measures its surroundings with its own sensors, which may include at least one of a lidar, a radar and an imaging sensor, and determines its own position and speed in relation to the elevator car and to the elevator shaft based on the obtained sensor information.

The UAV also receives status data of the elevator. The UAV may receive first status data wirelessly from the elevator controller via any one of its wireless communication interfaces. For example, the first status data may be received via a standardized application programming interface (API) provided towards the elevator controller, wherein the API is available over the external communication network (70). First status data may comprise for example elevator's landing call information and destination information. Second status data may be received wirelessly from the sensor unit (30) attached to the elevator car. The sensor unit may be an UAV docking station equipped with sensors, communication capability and a charging unit for charging the UAV, or the sensor unit may be a plain sensor unit having or operatively coupled to wireless communication unit for wirelessly sending status data to the UAV. The second status data received by the UAV from the sensor unit (30) may comprise for example current speed and/or acceleration of the elevator car. The second status data received by the UAV is may comprise raw sensor data, or raw sensor data may be pre-processed by the sensor unit to produce status data in any suitable format, before the status data is wirelessly sent to the UAV. Status data provided by the sensor unit improves accuracy and speed of determining of the motion characteristics of the elevator car and/or the monitored object. Improved accuracy of motion characteristics improves synchronization of movement of the UAV and with that of the elevator car and/or the monitored object moving with the elevator car. Thus, stability of the image of the monitored object provided by the imaging sensor of the UAV is improved.

The monitored object is preferably directly or indirectly coupled with the elevator car, and thus moving with the elevator car. The UAV avionics comprises a synchronization module that operates to match speed and acceleration of the UAV with the speed and acceleration of the elevator car, thus synchronizing the UAV's movement with that of the monitored object. Additionally, the UAV avionics maintains the UAV's orientation in relation to the shaft such that the object under inspection stays in the field of view of the respective imaging sensor.

In order to improve accuracy of the positioning accuracy a digital twin of the elevator is preferably used by the UAV to anticipate acceleration and speed curves of the elevator car. Use of the digital twin for facilitating synchronization of the movement makes the UAV independent of traditional proportional-integral-derivative (PID) control algorithm or other like algorithm that could cause increased delay in the synchronization. By using the digital twin, the UAV can autonomously adjust its own acceleration and speed with the expected acceleration and speed of the elevator car. Information obtained by sensors of the UAV and/or the imaging sensor of the UAV may further be utilized to fine tune synchronization of the movement of the UAV with movement of the monitored object.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for monitoring a movable object in an elevator shaft by an unmanned aerial vehicle (UAV), the method comprising:
   positioning the UAV into a wanted location within the elevator shaft, in which the movable object to be monitored is within view of an imaging sensor of the UAV;
   determining the UAV's position and movement characteristics based on information obtained by at least one sensor carried by the UAV;
   wirelessly receiving status data concerning an elevator car moveable within the elevator shaft;
   matching speed and acceleration of the UAV with the speed and acceleration of the elevator car moving in the elevator shaft by automatically synchronizing movement of the UAV with the movement of the movable object based on the determined UAV's own position and movement characteristics and the received status data, and simultaneously obtaining, by the imaging sensor of the UAV, image data of the movable object during operation of the elevator; and
   storing and/or wirelessly sending the obtained image data showing the movable object.

2. The method according to claim 1, wherein said positioning the UAV into the wanted location comprises:
   a) receiving an indication of the movable object as a reference to the respective object in a digital twin of the elevator, and automatically moving the UAV to the wanted location using the digital twin of the elevator and said UAV's position and movement characteristics, or
   b) guiding the UAV to the wanted location using manual remote control, and receiving an indication of the movable object to be monitored from the user by a reference to the image of the movable object shown in the image provided by means of the imaging sensor of the UAV.

3. The method according to claim 2, wherein the status data comprises at least one of elevator's landing call information, destination information and sensor information related to movement and/or position of the elevator car within the elevator shaft.

4. The method according to claim 2, wherein said synchronizing movement of the UAV with the movement of the movable object is performed using a/the digital twin of the elevator, based on the determined UAV's own position and movement characteristics and the received status data.

5. The method according to claim 1, wherein the status data comprises at least one of elevator's landing call information, destination information and sensor information related to movement and/or position of the elevator car within the elevator shaft.

6. The method according to claim 5, wherein the status data comprises first status data and/or second status data, wherein the method comprises:
   receiving the first status data using wireless communication, the first status data comprising the elevator's landing call information and/or destination information from an elevator controller; and/or
   receiving the second status data using wireless communication, wherein the second status data is generated on basis of sensor information obtained by one or more sensors of a sensor unit attached to the elevator car, wherein the second status data comprises at least one of location, acceleration and speed of the elevator car and/or the sensor unit.

7. The method according to claim 6, wherein said synchronizing movement of the UAV with the movement of the movable object is performed using a/the digital twin of the elevator, based on the determined UAV's own position and movement characteristics and the received status data.

8. The method according to claim 5, wherein said synchronizing movement of the UAV with the movement of the movable object is performed using a/the digital twin of the elevator, based on the determined UAV's own position and movement characteristics and the received status data.

9. The method according to claim 1, wherein said synchronizing movement of the UAV with the movement of the movable object is performed using a/the digital twin of the elevator, based on the determined UAV's own position and movement characteristics and the received status data.

10. A system for monitoring a movable object in an elevator shaft, the system comprising:
   an unmanned aerial vehicle (UAV) comprising an imaging sensor and at least one sensor configured to provide information on position and movement characteristics of the UAV; and
   a display unit configured to display an image obtained by the imaging sensor of the UAV;
   wherein the UAV is configured:
   to be positioned into a wanted location within the elevator shaft in which the movable object to be monitored is within view of the imaging sensor of the UAV;
   to determine its position and movement characteristics based on information obtained by the at least one sensor comprised in the UAV;
   to receive status data concerning an elevator car moveable within the elevator shaft;
   to match speed and acceleration of the UAV with the speed and acceleration of the elevator car moving in the elevator shaft by automatically synchronizing movement of the UAV with the movement of the movable object based on the determined UAV's own position and movement characteristics and the received status data, and to simultaneously obtain, by the imaging sensor, image data of the movable object during operation of the elevator, and
   to store and/or to wirelessly send the obtained image data showing the movable object for displaying the obtained image data on the display apparatus.

11. The system according to claim 10, wherein the UAV comprises:
   a) a digital twin of the elevator, and communication means for receiving an indication of the movable object as a reference to the respective object in the digital twin of the elevator, wherein the UAV is configured to automatically move to a wanted location using at least the digital twin of the elevator and the UAV's position and movement characteristics, or
   b) communication means configured to receive instructions provided by using a manual remote control unit for guiding the UAV into the wanted location, and to receive an indication of the movable object to be monitored from the user by a reference to an image of the movable object shown in an image obtained by the imaging sensor of the UAV and displayed by the display apparatus.

12. The system according to claim 11, wherein the status data comprises at least one of elevator's landing call information, destination information and sensor information related to movement and/or position of the elevator car within the elevator shaft.

13. The system according to claim 11, wherein the UAV comprises a/the digital twin of the elevator, and the UAV is configured to synchronize its movement with the movement of the movable object using the digital twin of the elevator, based on the determined UAV's own position and movement characteristics and the received status data of the elevator car.

14. The system according to claim 10, wherein the status data comprises at least one of elevator's landing call information, destination information and sensor information related to movement and/or position of the elevator car within the elevator shaft.

15. The system according to claim 14, wherein the status data comprises first status data and/or second status data, and wherein the UAV comprises at least one wireless communication unit configured:
   to receive the first status data concerning the elevator's landing call information and/or destination information from an elevator controller; and/or
   to receive the second status data, wherein the second status data generated on basis of sensor information obtained by one or more sensors of a sensor unit attached to the elevator car comprises at least one of location, acceleration and speed of the elevator car and/or the sensor unit.

16. The system according to claim 15, wherein the UAV comprises a/the digital twin of the elevator, and the UAV is configured to synchronize its movement with the movement of the movable object using the digital twin of the elevator, based on the determined UAV's own position and movement characteristics and the received status data of the elevator car.

17. The system according to claim 14, wherein the UAV comprises a/the digital twin of the elevator, and the UAV is configured to synchronize its movement with the movement of the movable object using the digital twin of the elevator, based on the determined UAV's own position and movement characteristics and the received status data of the elevator car.

18. The system according to claim 10, wherein the UAV comprises a/the digital twin of the elevator, and the UAV is configured to synchronize its movement with the movement of the movable object using the digital twin of the elevator, based on the determined UAV's own position and movement characteristics and the received status data of the elevator car.

* * * * *